US011395483B1

(12) United States Patent
Lafontaine

(10) Patent No.: US 11,395,483 B1
(45) Date of Patent: Jul. 26, 2022

(54) ICE FISHING HOLE CHAMFERER AND METHOD

(71) Applicant: Robert Matthew Lafontaine, Hermantown, MN (US)

(72) Inventor: Robert Matthew Lafontaine, Hermantown, MN (US)

( * ) Notice: Subject to any disclaimer, the term of this patent is extended or adjusted under 35 U.S.C. 154(b) by 123 days.

(21) Appl. No.: 16/589,137

(22) Filed: Oct. 1, 2019

Related U.S. Application Data

(60) Provisional application No. 62/739,332, filed on Sep. 30, 2018.

(51) Int. Cl.
*A01K 97/01* (2006.01)
*B26D 3/02* (2006.01)

(52) U.S. Cl.
CPC ................ *A01K 97/01* (2013.01); *B26D 3/02* (2013.01)

(58) Field of Classification Search
CPC ........ A01K 97/01; A01K 97/00; A01K 99/00; E21B 7/00; E21B 7/008; B26D 3/02
USPC .................................................. 43/4, 4.5, 1
See application file for complete search history.

(56) References Cited

U.S. PATENT DOCUMENTS

| 2,117,688 | A | * | 5/1938 | Stone | ...................... | B64C 11/04 |
| | | | | | | 416/88 |
| 3,051,253 | A | | 8/1962 | McCann | | |
| 3,198,266 | A | | 8/1965 | Mishler | | |

(Continued)

FOREIGN PATENT DOCUMENTS

| WO | WO2006062453 A1 | 6/2006 | |
| WO | WO-2014184439 A1 * | 11/2014 | ............. E21B 7/008 |

*Primary Examiner* — Darren W Ark
*Assistant Examiner* — Kevin M Dennis
(74) *Attorney, Agent, or Firm* — Avery, Whigham & Winesett, P.A.; Nathan Stamey Winesett

(57) ABSTRACT

The present invention provides an ice fishing hole chamferer 10 with an elongated shaft 20 for inserting into an ice fishing hole 160 having a top end 60 and a submerged end 30 with an axle 40 and an axis 50, and a propeller 90 having a cutter side 96 with at least one cutter 94 and a thrust side 98 configured for propelling water, said propeller having a hub 80 for connecting to the axle and at least two radiating propeller blades 92, wherein the propeller blades are hinged to the hub to move between a narrow closed position less than the diameter of the ice fishing hole 160 and situated along the axis of the elongated shaft and an extended open position greater than the diameter of the ice fishing hole and angled for chamfering the bottom 162 of the ice fishing hole at a chamfering angle 128, and a propelling means 70, 110, 100 for rotating the propeller, wherein the propeller revolves about the axis and the propeller blades are configured to centrifugally extend to the extended open position and thrust upwardly to engage the at least one cutter against the bottom 162 of the ice fishing hole when the propelling means is activated. The invention also provides a method for using an ice fishing hole chamferer 10 by drilling an ice fishing hole 160, inserting the ice fishing hole chamferer into the hole, rotating the elongated shaft 20 of the chamferer to revolve a collapsible propeller 90 around the axis 50 and centrifugally extend the collapsible propeller from a narrow closed position to an extended open position angled for chamfering the bottom of the ice fishing hole 162.

11 Claims, 8 Drawing Sheets

(56) References Cited

U.S. PATENT DOCUMENTS

| | | | | |
|---|---|---|---|---|
| 3,299,970 | A * | 1/1967 | Anderson | F16D 1/101 |
| | | | | 175/18 |
| 3,336,989 | A * | 8/1967 | Henderson | A01K 97/01 |
| | | | | 175/18 |
| 3,397,750 | A * | 8/1968 | Wicklund | A01K 97/01 |
| | | | | 175/18 |
| 3,430,456 | A * | 3/1969 | Stricker | A01K 97/01 |
| | | | | 464/8 |
| 3,662,844 | A * | 5/1972 | Baker | A01K 97/01 |
| | | | | 175/18 |
| 3,749,184 | A * | 7/1973 | Andeen | A01K 97/01 |
| | | | | 175/18 |
| 4,819,744 | A * | 4/1989 | Caswell | E21B 7/008 |
| | | | | 175/18 |
| 5,038,870 | A | 8/1991 | Kuronen | |
| 5,190,113 | A * | 3/1993 | Hawrylak | E21B 7/008 |
| | | | | 175/18 |
| 5,851,131 | A * | 12/1998 | Bergeron | B63H 3/008 |
| | | | | 440/50 |
| 5,873,419 | A * | 2/1999 | Berry | E21B 10/28 |
| | | | | 175/18 |
| 5,950,738 | A * | 9/1999 | Caswell | A01K 97/01 |
| | | | | 175/18 |
| 7,946,355 | B1 * | 5/2011 | Kluge | E21B 7/008 |
| | | | | 175/18 |
| 9,560,838 | B1 * | 2/2017 | King | A01K 61/78 |
| 10,779,524 | B2 * | 9/2020 | Schlieman | F25C 5/043 |
| 2005/0173874 | A1 * | 8/2005 | Bouchard | A01K 97/01 |
| | | | | 280/28.17 |
| 2007/0256860 | A1 * | 11/2007 | Norling | E21B 7/008 |
| | | | | 175/18 |
| 2010/0074702 | A1 * | 3/2010 | Kluge | A01K 97/01 |
| | | | | 408/125 |
| 2010/0288556 | A1 * | 11/2010 | Norling | A01K 97/01 |
| | | | | 175/18 |
| 2013/0047489 | A1 * | 2/2013 | Walker | A01K 97/01 |
| | | | | 43/4.5 |
| 2016/0010393 | A1 * | 1/2016 | Ivan, Sr. | A01K 97/01 |
| | | | | 175/18 |
| 2017/0238518 | A1 * | 8/2017 | Davenport | A01K 99/00 |
| 2017/0298695 | A1 * | 10/2017 | Kluge | A01K 97/01 |
| 2019/0032412 | A1 * | 1/2019 | Banjo | E21B 10/44 |
| 2021/0115939 | A1 * | 4/2021 | MacDonald | F04D 29/705 |

* cited by examiner

ICE FISHING HOLE CHAMFERER AND METHOD

CLAIM OF PRIORITY

This application is based on and claims the benefit of priority from U.S. provisional application No. 62/739,332.

STATEMENT REGARDING FEDERALLY SPONSORED RESEARCH/DEVELOPMENT

Not Applicable.

FIELD OF THE INVENTION

The present invention relates to an accessory for angling and more particularly the invention relates to an invention to chamfer the bottom of an ice fishing hole.

BACKGROUND OF THE INVENTION

Ice fishing is a type of angling that typically involves a fisherman fishing on top of a body of water that has a frozen surface layer. The fisherman can drill a hole through the frozen surface layer with an auger. This typically leaves an ice fishing hole with sharp edges at the bottom of the hole. If the angler drills straight down, the bottom of the hole will often have edges at approximately right angles. This can be undesirable because those edges can damage the fishing line by frequently nicking the line and it can be difficult to guide a caught fish through the hole, particularly if the fish is fighting the angler.

SUMMARY OF THE INVENTION

It has been recognized that it would be advantageous to develop an improved device and method for cutting a chamfer into the bottom of an ice fishing hole.

The invention provides for an ice fishing hole chamferer having an elongated shaft for inserting into an ice fishing hole having a top end and a submerged end with an axle. The elongated shaft also can have an axis. This axis can be an imaginary line situated along the center length of the elongated shaft.

The elongated shaft can be of sufficient length to allow an angler to operate the top end of the shaft above the ice hole and to allow the submerged end to reach below the ice hole. The length of the elongated shaft can be adjustable to accommodate differing thicknesses of the ice surfaces on a body of water. The elongated shaft can have at least three adjustable lengths between approximately 50 inches and approximately 90 inches. The elongated shaft can comprise two telescoping poles for adjusting the length. The inner telescoping pole can have a series of inner holes along the length of the pole. The outer telescoping pole can have a matching hole and a securing pin for inserting through the matching hole and into one of the inner holes for setting the length of the elongated shaft.

The elongated shaft can include a foot stop on the submerged end for resting the ice fishing hole chamferer on a solid surface, such as the ice, ground, or floor. The foot stop can extend beyond the propeller blades when in the narrow closed position.

The top end of the elongated shaft can be configured to attach a hand brace for rotating the elongated shaft. The hand brace can have a top spindle that the angler can hold with one hand and a U-shaped crank with a crank spindle that the angler can hold with the other hand. The spindles can freely turn so that the angler can turn the brace without adjusting her hands. The hand brace and elongated shaft can also be configured to attach with a quick-release adapter for quickly removing the hand brace from the elongated shaft.

The top end of the elongated shaft can also be configured to attach a motor for rotating the elongated shaft. The motor can be a power auger motor, such as an ice fishing auger motor. The motor and the elongated shaft can be configured to be removably attached with a quick-release adapter for quickly removing the elongated shaft from the motor. With the use of a quick-release adapter, the angler can quickly switch the motor between a power auger drill for drilling ice fishing holes and the elongated shaft of the ice fishing hole chamferer.

The elongated shaft can be configured for inserting into an ice fishing hole. The elongated shaft can have a submerged end opposite the top end of the elongated shaft. The elongated shaft can be an axle for rotating the submerged end. The submerged end can attach to a hub so that the hub can be rotated by the turning axle.

The invention also provides for a propeller. The propeller can have a hub for connecting to an axle. The axle can be the elongated shaft. The elongated shaft can be rotated by a hand brace or a motor to turn the axle.

The invention can also have a propelling means for rotating the propeller, wherein the propeller revolves about the axis and the propeller blades are configured to centrifugally extend to the extended open position and thrust upwardly to engage the at least one cutter against the bottom of the ice fishing hole when the propelling means is activated.

The propelling means can be removably connected to the top end of the elongated shaft and can turn the axle and the hub and the propeller around the axis. The propelling means can be a hand-powered mechanism, such as a hand brace. The propelling means can be a motor. The propelling means can be an adapter configured to removably connect to an auger motor. The propelling means can be selected from a group consisting of a hand-powered mechanism, a motor, and an adapter configured to removably connect to an auger motor.

The rotating axle can rotate the hub and the propeller. The submerged and turning propeller can generate a downward thrust and cause an upward lift forcing the top side of the propeller upwards towards the bottom of the ice fishing hole. The downward thrust can also cause the propeller blades to extend to the extended open position.

The propeller can have a cutter side with at least one cutter and a thrust side configured for propelling water. The cutter side can be on the top side of the propeller with the thrust side on the bottom side of the propeller. The upward lift can cause the cutter side to engage the bottom of the ice fishing hole for cutting a chamfer into the ice forming the circumference of the bottom of the ice fishing hole.

The propeller can have at least two radiating propeller blades. The propeller can have three radiating blades. The propeller blade can have a guide surface on the cutter side for aligning the cutting blade at a cutting position against the bottom of the ice fishing hole.

The propeller blade can have a leading edge and a trailing edge. The leading edge can be the edge of the blade that cuts through the water first when the propeller turns. The blade can have a leading guide plate having a leading edge and a trailing fin having a trailing edge. The leading guide plate and the trailing fin can form a blade angle on the thrust side of the blade. The blade angle can be an angle configured for cutting the ice. The blade angle can be an angle configured for trimming the ice. The blade angle can be configured to prevent the propeller from become stuck in the ice when chamfering. The blade angle can be approximately between 115 and 125 degrees. The blade angle can be approximately 120 degrees. In one embodiment, the blade angle is 121.5 degrees. The trailing fin can be angled or contoured to propel the water when turning to generate upward thrust.

The propeller blade can be a single sheet with a blade bend forming the blade angle between the leading guide plate and the trailing fin. The trailing fin can have a cutter attached to the cutter side of the trailing fin. The cutter can be removably mounted to the trailing fin. This can allow the cutter to be removed for sharpening. The cutter can also be adjustably mounted to the cutter side of the propeller blade. The cutter can also be adjustably mounted to the trailing fin. This can allow the cutting depth to be varied or to allow for resetting the desired cutting depth after wear of the cutter from use and sharpening. The cutter can also have a sharpened edge. The sharpened edge can extend beyond the blade bend to establish the cutting depth. In one embodiment, the cutting depth is ⅛".

The leading guide plate can be configured as a leading guide or a sole for the cutter. When the propeller blade is thrust against the ice of the bottom of the hole, the sole can contact the ice at the bottom of the ice fishing hole at the chamfer angle. The leading guide plate or sole can position the cutter to shave the ice at the chamfer angle. The leading guide plate can also have at least one clearance opening for allowing ice to be washed away from the cutter. The clearance opening can be a slot in the leading guide plate situated between the leading edge and the sharpening edge the cutter.

The propeller blades can be hinged to the hub. This can allow the propeller blades to move between a narrow closed position less than the diameter of the ice fishing hole and situated along the axis of the elongated shaft and an extended open position greater than the diameter of the ice fishing hole and angled for chamfering the bottom of the ice fishing hole at a chamfering angle. The narrow closed position can allow the chamferer to have a narrow diameter that is less than the ice fishing hole diameter. This can allow the chamferer to be inserted into the ice fishing hole. When the propeller blade are in the narrow closed position, they can also be in a relaxed position when the propelling means is idle. The activation of the propelling means can cause the propeller blades to move to the extended open position.

The propeller blades can be approximately 17 inches long and extend approximately 14 inches from the axis when the propeller is in the extended open position. The propeller blades can be approximately 11 inches long and extend approximately 9 inches from the axis when the propeller is in the extended open position. The propeller blade can have an adjustable length between approximately 9 inches and approximately 17 inches. The longer length can be beneficial to a hand-powered mechanism to generate more thrust whereas a shorter length can reduce the thrust when using a motor.

The invention also provides for a means for rotating the elongated shaft and engaging the rotation of the propeller, wherein the propeller blades revolve and centrifugally extend to the extended position and thrust upwardly to engage the at least one cutter against the bottom of the ice fishing hole. By turning the elongated shaft, the propeller action of the propeller blades can force the propeller blades to move to the extended position. The hub can have a propeller stop for setting the fully extended open position at the chamfering angle.

The chamfering angle can be approximately 45 degrees. The chamfering angle can be between approximately 30 and 60 degrees.

The invention also provides for a method of using an ice fishing hole chamferer by drilling an ice fishing hole, inserting an elongated shaft with an axis and having a collapsible propeller configured to revolve around the elongated shaft, said propeller having a cutter side with at least one cutter for chamfering the bottom of the ice fishing hole and a thrust side for propelling water and thrusting the cutter side against the bottom of the ice fishing hole, and rotating the elongated shaft to revolve the collapsible propeller around the axis and centrifugally extend the collapsible propeller from a narrow closed position less than the diameter of the ice fishing hole and situated along the axis of the elongated shaft to an extended open position greater than the diameter of the ice fishing hole and angled for chamfering the bottom of the ice fishing hole.

DETAILED DESCRIPTION OF THE INVENTION

Figure 1:
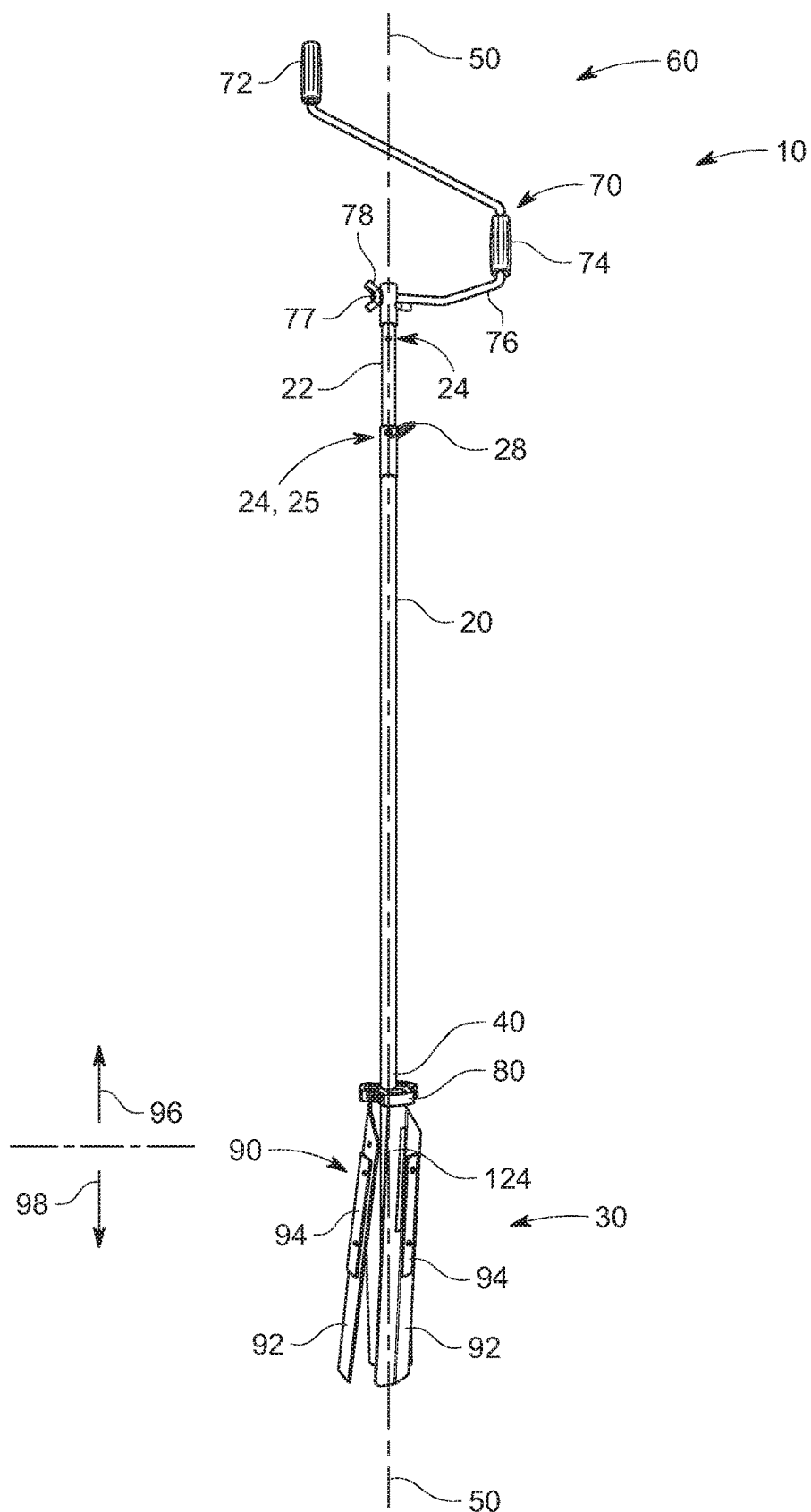
FIG. 1 shows a front view of an ice fishing hole chamferer with a hand brace in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in the Figures, the invention provides for an ice fishing hole chamferer having an elongated shaft 20 for inserting into an ice fishing hole 160 having a top end 60 and a submerged end 30 with an axle 40. As shown in FIG. 1, the elongated shaft 20 also can have an axis 50. This axis can be an imaginary line situated along the center length of the elongated shaft.

The elongated shaft 20 can be of sufficient length to allow an angler to operate the top end 60 of the shaft above the ice hole 160 and to allow the submerged end 30 to reach below the ice hole. The length of the elongated shaft can be adjustable to accommodate differing thicknesses of the ice surfaces on a body of water. The elongated shaft can comprise two telescoping poles for adjusting the length. The inner telescoping pole 22 can have a series of inner holes 24 along the length of the pole. The outer telescoping pole 20 can have a matching hole 25 and a securing pin 28 for inserting through the matching hole and into one of the inner holes for setting the length of the elongated shaft. The elongated shaft can have at least three adjustable lengths between approximately 50 inches and approximately 90 inches.

The ability to adjust the length of the elongated shaft 20 can be particular useful to accommodate anglers of differing heights or to switch from fishing directly on the ice to fishing in a fish house that may have a floor elevated above the ice fishing hole.

The top end 60 of the elongated shaft 20 can be configured to attach a hand brace 70 for rotating the elongated shaft manually or by hand. The hand brace can have a top spindle 72 that the angler can hold with one hand and a U-shaped crank 76 with a crank spindle 74 that the angler can hold with the other hand. The spindles can freely turn so that the angler can turn the brace without adjusting her hands. The hand brace and elongated shaft can also be configured to attach with a quick-release or quick-connect adapter 110 for quickly removing the hand brace from the elongated shaft.

Operating the ice fishing hole chamferer 10 manually can be useful because some fishing areas do not allow motors. Additionally, the hand-operated chamferer can be advantageous because it does not need an electrical or fuel power source and it does not create gas fumes. This is particularly beneficial when fishing inside a fish house that may trap gas fumes and lack electricity. Another advantage of the hand-operated chamferer can be that it can be cheaper, lighter in weight, smaller in size, and more convenient to have and carry and store, particularly in a small ice-fishing house, for periodic chamfering of an ice fishing hole 160. Anglers sometimes desire a motorized auger to drill an initial ice-fishing hole, but thereafter may keep the hole open with use of heat or foam. An hand-operated ice-fishing hole chamferer can quickly chamfer or re-chamfer the bottom of an ice fishing hole.

Figure 5:
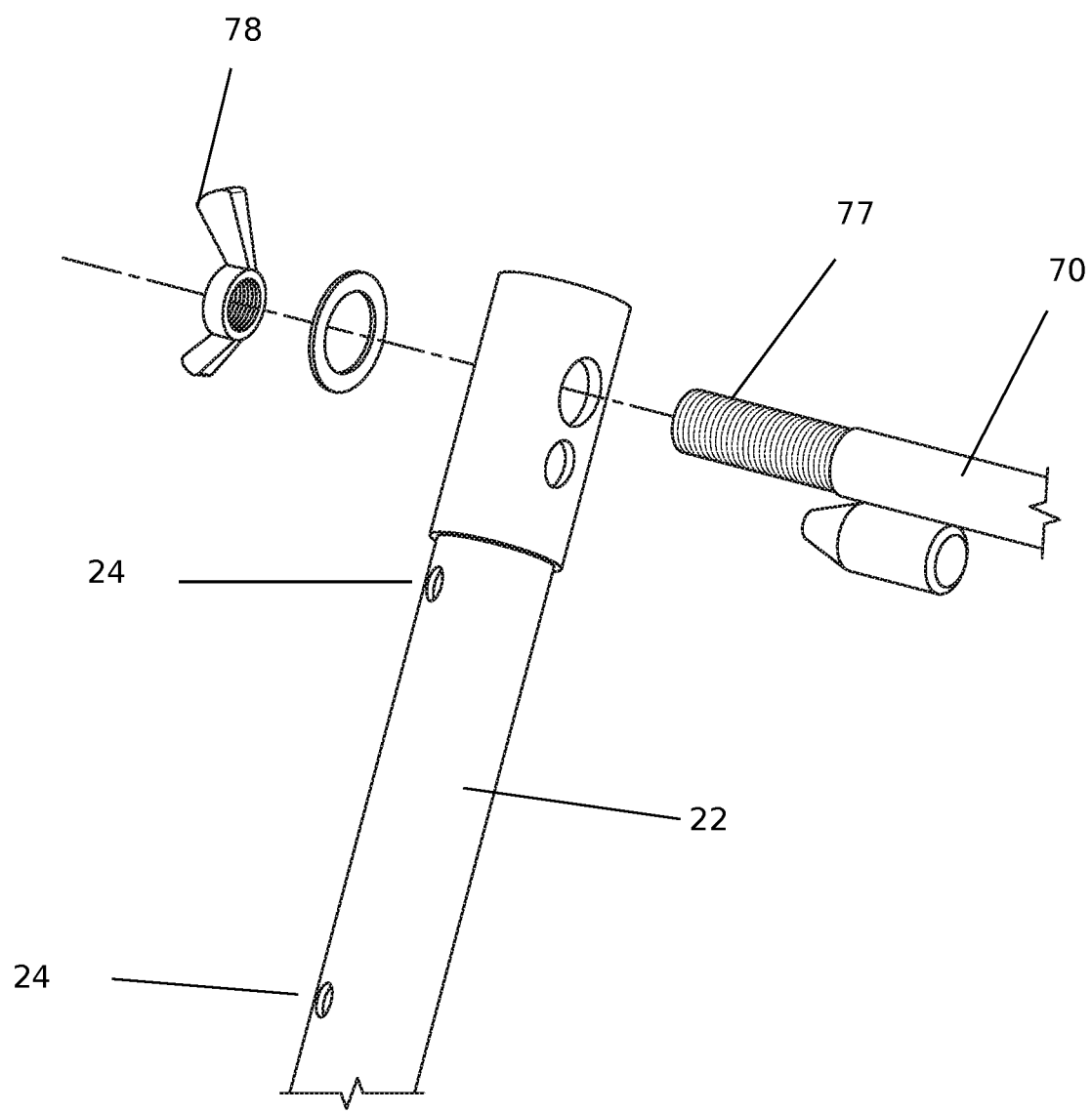
FIG. 5 shows an exploded front right perspective view of the top end of a hand-operated ice fishing hole chamferer with a hand brace in accordance with another embodiment of the present invention, showing a hand brace removably connected by a wing nut.

As shown in FIG. 5, the hand brace 70 can be removably connected to the elongated shaft 20. In the embodiment shown in FIGS. 1 and 5, the hand brace is removably connected to the elongated shaft by a threaded end 77 inserted through a hole near the top end of the elongated shaft and secured by a wing nut 78. This can allow the hand brace to be removed for making it easier to transport and store and package.

Figure 2:
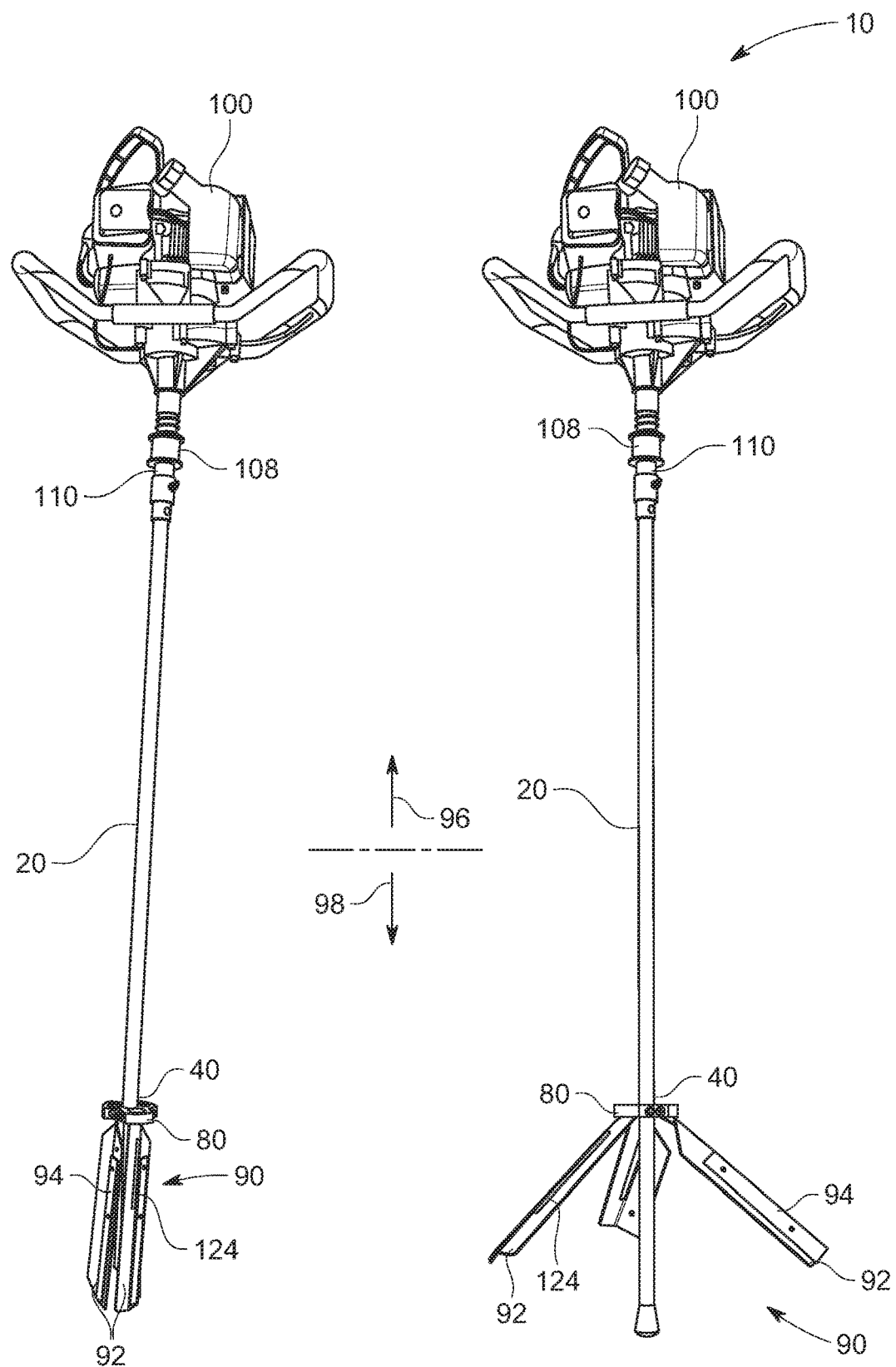
FIG. 2 shows a front view of an ice fishing hole chamferer in the narrow closed position (left) and a rear view in the extended open position (right), each with a motor and a quick connect adapter in accordance with another embodiment of the present invention.

As shown in FIG. 2, the top end 60 of the elongated shaft 20 can also be configured to attach a motor 100 for rotating the elongated shaft. The motor can be a power auger motor 100. The motor can have a quick-release 108. The elongated shaft can be configured to attach with a quick-release adapter 110, or an adapter 110 configured to removably connect to an auger motor 100, for quickly removing the elongated shaft from a motor configured with a quick-release. With the use of a quick-release adapter, the angler can quickly switch the motor between a power auger drill for drilling ice fishing holes 160 and the elongated shaft 20 of the ice fishing hole chamferer 10. This can be useful for an angler that uses a motorized power auger for drilling ice fishing holes. After such an angler drills the ice-fishing hole, the motor can be removed from the power auger drill and can be attached to the ice-fishing hole chamferer 10 for chamfering the bottom 162 of the ice fishing hole. Notably, after the power auger drill breaks through the ice, the drill or auger can cause water from the ice-fishing hole to be drawn up through the hole and into the angler and on top of the ice. This can be undesirable. By removing the power auger drill from the motor and replacing it with an ice fishing hole chamferer, or alternatively using a hand-operated ice-fishing hole chamferer, the bottom of the ice fishing hole can be shaped or chamfered without excess water being drawn up through the hole.

The elongated shaft 20 can be configured for inserting into an ice fishing hole 160. The elongated shaft can have a submerged end 30 opposite the top end 60 of the elongated shaft. The elongated shaft can be an axle 40 for rotating the submerged end. The submerged end can attach to a hub so that the hub 80 can be rotated by the turning axle.

Figure 7:
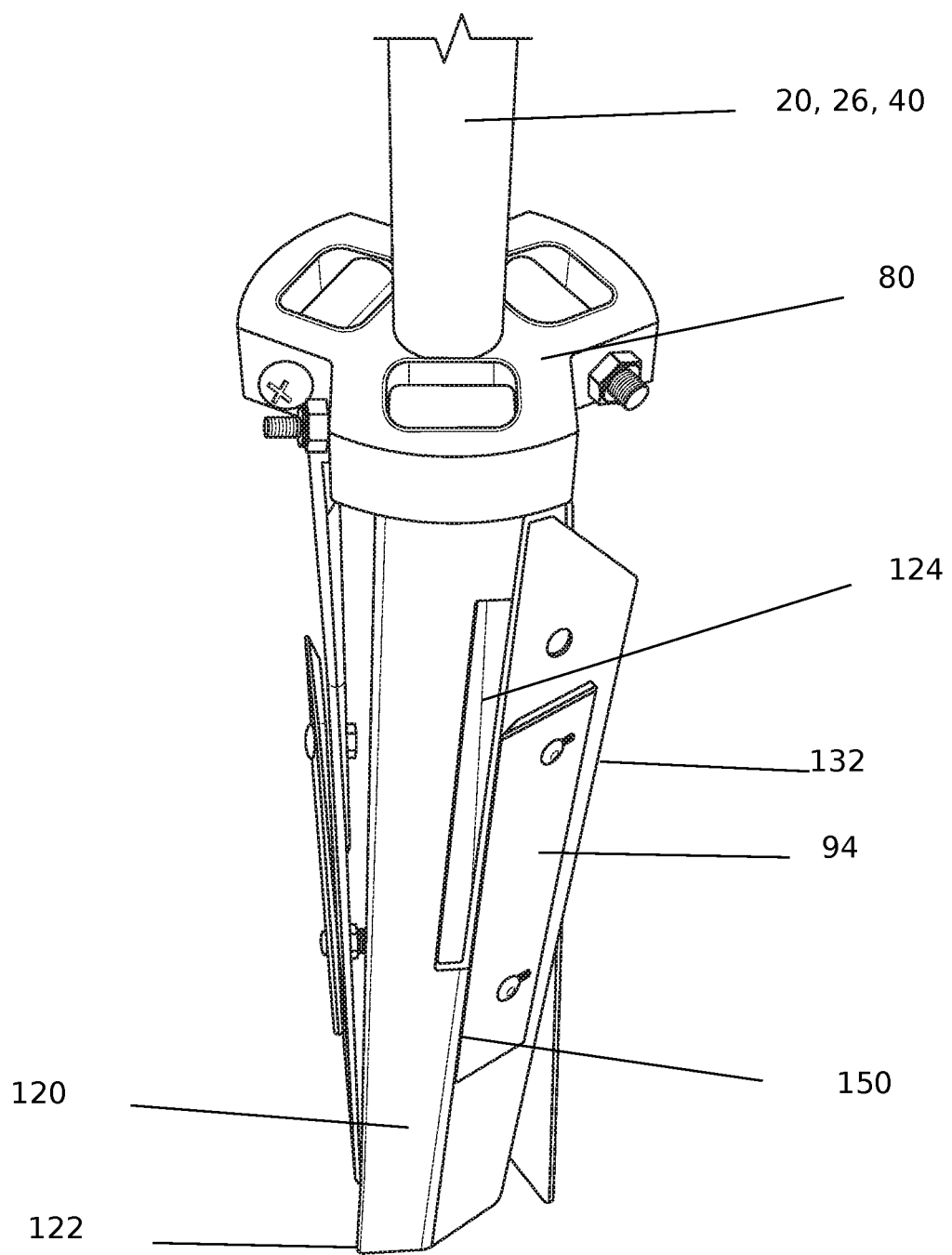
FIG. 7 shows a front perspective view of a submerged end of the elongated shaft of an ice fishing hole chamferer in accordance with an embodiment of the present invention showing the propeller in the narrow closed position.

The invention also provides for a propeller 90. As shown in FIG. 7, the propeller can have a hub 80 for attaching to an axle 40. The axle can be the elongated shaft 20. The elongated shaft can be rotated by a hand brace 70 or a motor 100 to turn the axle and the hub and the propeller.

The invention can also have a propelling means for rotating the propeller 90, wherein the propeller revolves about the axis 50 and the propeller blades 92 centrifugally extend to the extended open position and thrust upwardly to engage the at least one cutter 94 against the bottom 162 of the ice fishing hole 160 when the propelling means is activated.

Figure 6:
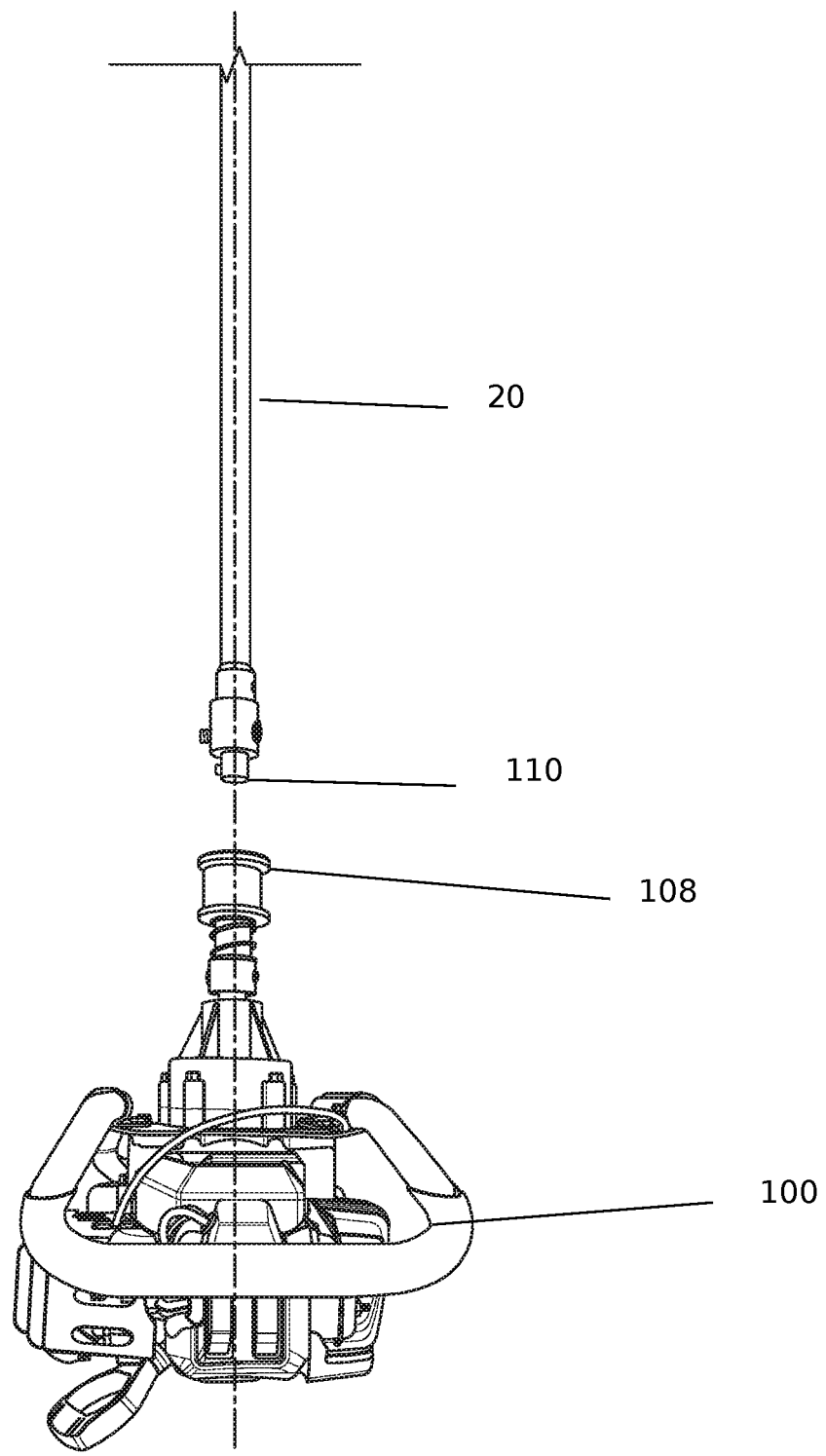
FIG. 6 shows a left view of an ice fishing hole chamferer in accordance with an embodiment of the present invention showing an adapter configured to removably connect to an auger motor and the disconnected auger motor.

The propelling means can be removably connected to the top end 60 of the elongated shaft and can turn the axle and the hub and the propeller around the axis. The propelling means can be a hand-powered mechanism, such as a hand brace 70, a motor 100, or, as shown in FIG. 6, an adapter 110 configured to removably connect to an auger motor, such as an auger motor that has been removed from the auger used to drill the ice fishing hole and switched to be used with the ice fishing hole chamferer.

The rotating axle 40 can rotate the hub 80 and the propeller 90. The submerged end 30 and turning propeller can generate a downward thrust and cause an upward lift forcing the top side or cutter side 96 of the propeller upwards towards the bottom 162 of the ice fishing hole 160.

The propeller 90 can have a cutter side 96 with at least one cutter and a thrust side 98 configured for propelling water. The cutter side can be on the top side of the propeller with the thrust side on the bottom side of the propeller. The upward lift can cause the cutter side to engage the bottom 162 of the ice fishing hole 160 for cutting a chamfer into the ice forming the circumference of the bottom of the ice fishing hole.

Figure 3:
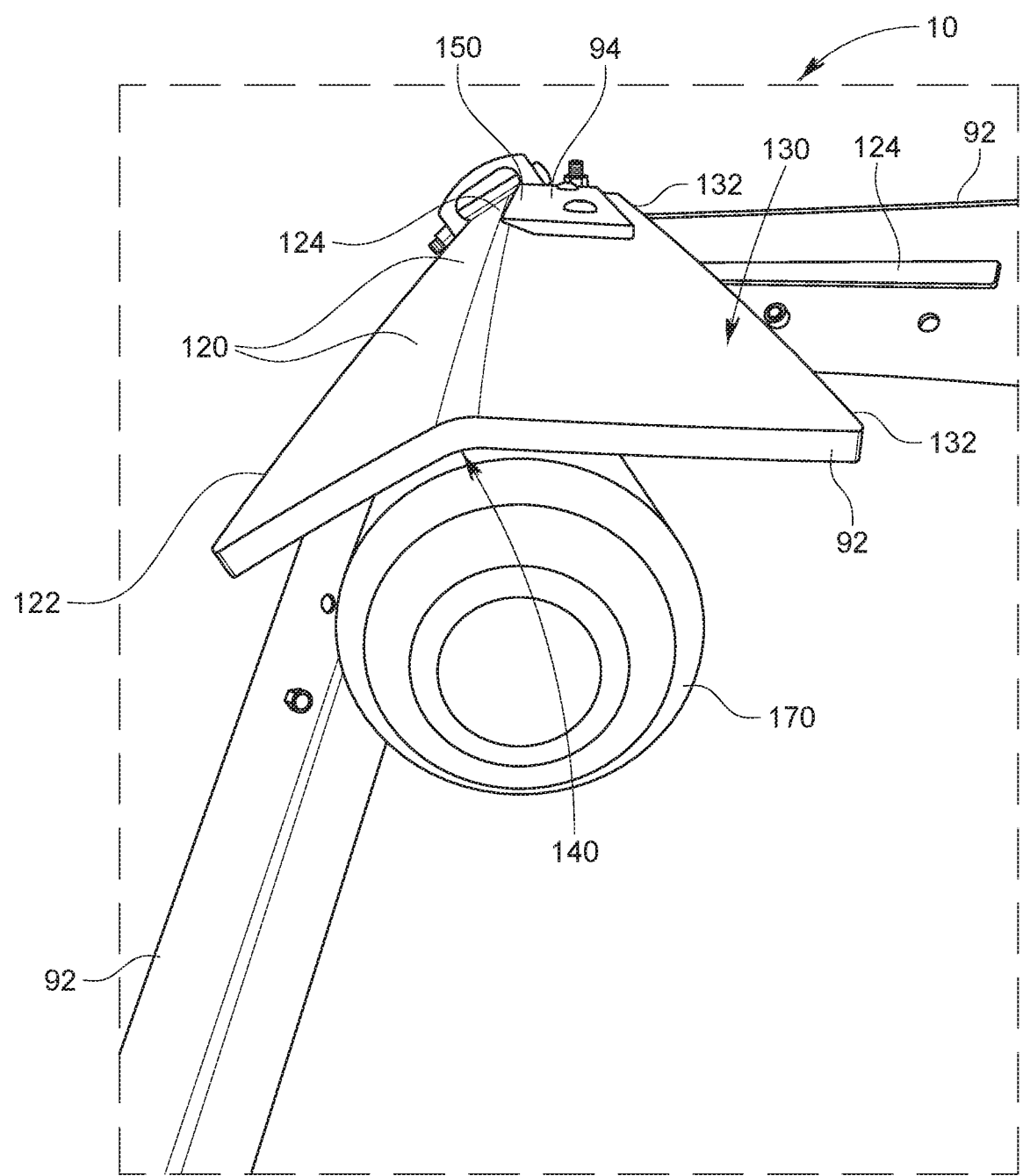
FIG. 3 shows a bottom front perspective view of the submerged end of an elongated shaft and propeller blade of an ice fishing hole chamferer in accordance with another embodiment of the present invention, showing a foot stop, sole or guide surface, leading edge, trailing fin, trailing edge, and cutting blade and sharpened edge.

The propeller 90 can have at least two radiating propeller blades 92. The propeller can have three radiating blades, as shown in the Figures. As shown in FIG. 3, the propeller blade can have a guide surface 120 for aligning the cutting blade 94 at a cutting position against the bottom of the ice fishing hole.

The propeller blade 92 can have a leading edge 122 and a trailing edge 132. The leading edge can be the edge of the blade that cuts through the water first when the propeller turns. The blade can have a leading guide plate 120 having a leading edge and a trailing fin 130 having a trailing edge 132. The leading guide plate and the trailing fin can form a blade angle 140. The blade angle can be approximately between 115 and 125 degrees on the thrust side of the blade. The blade angle can be approximately 120 degrees. In one embodiment, the blade angle is 121.5 degrees. The trailing fin can be angled or contoured to propel the water when turning to generate upward thrust.

As shown in FIG. 3, the propeller blade 92 can be a single sheet with a blade bend forming the blade angle 140 between the leading guide plate 120 and the trailing fin 130. The trailing fin can have a cutter 94 attached to the cutter side 96 of the trailing fin. The cutter can be removably mounted to the trailing fin. This can allow the cutter to be removed for sharpening. The cutter can also be adjustably mounted to the cutter side of the propeller blade. The cutter can also be adjustably mounted to the trailing fin. This can allow the cutting depth to be varied or to allow for resetting the desired cutting depth after wear of the cutter from use and sharpening. This can also allow for the cutting blade to be adjusted radially from the axis 50 to accommodate chamfering different diameter ice fishing holes 160. For example, the cutting blade can be mounted closer to the axis for a 6 inch diameter ice fishing hole or farther from the axis for an 8 inch or a 10 inch ice fishing hole. In this manner, the ice fishing hole chamferer can accommodate different size ice fishing holes without the need to have a longer cutting blade 94. This can decrease costs and sharpening time and unnecessary drag in the water and unintentional interference or cutting of away from the chamfering target area. In one embodiment, the cutting blade is 7 inches long.

The cutter 94 can also have a sharpened edge 150. The sharpened edge can extend beyond the blade bend 140, as shown in FIG. 3, to establish the cutting depth. In one embodiment, the cutting depth is ⅛ inch. In other embodiments, the cutting depth is approximately ⅛ inch.

Figure 4:
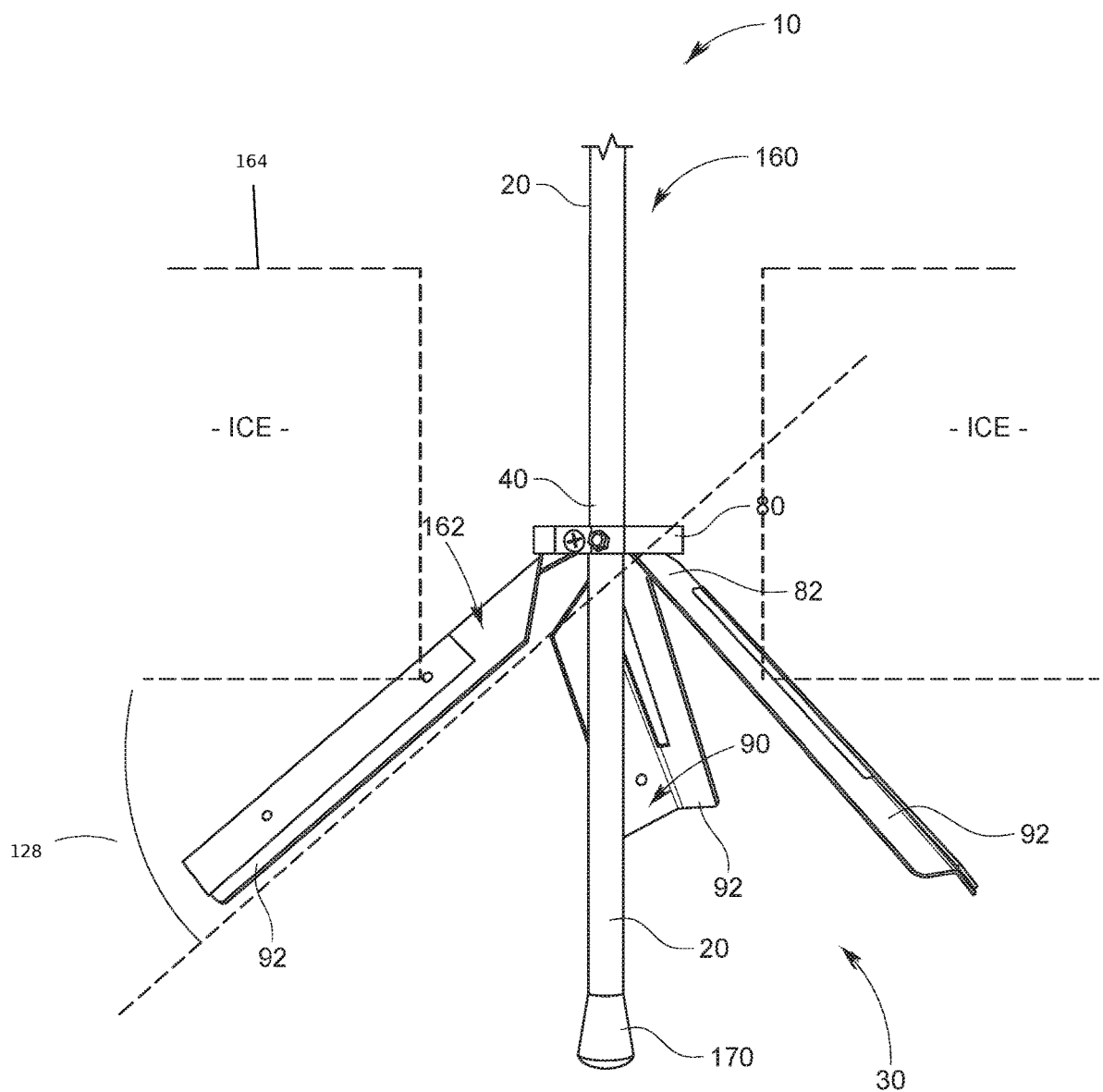
FIG. 4 shows a rear view of the submerged end of the elongated shaft and propeller of an ice fishing hole chamferer in accordance with another embodiment of the present invention shown in an ice fishing hole, and further showing a chamfering angle.

The leading guide plate 120 can be configured as a leading guide 120 or a sole 120 for the cutting blade 94. As shown in FIG. 4, when the propeller blade 92 is thrust against the ice of the bottom 162 of the hole 160, the sole 120 can contact the ice at the bottom of the ice fishing hole at the chamfer angle 128. The leading guide plate or sole can position the cutter 94 to shave the ice at the chamfer angle. The chamferer can be configured with a chamfering angle 128 between approximately 30 and 60 degrees. The chamfering angle can be 45 degrees. The chamfering angle can be approximately 45 degrees.

The leading guide plate can also have at least one clearance opening 124 for allowing ice shaved off the bottom 162 of the ice fishing hole 160 to be washed away from the cutter. The clearance opening can be a slot in the leading guide plate situated between the leading edge 122 and the sharpened edge 150 the cutter 94.

The propeller blades 92 can be hinged to the hub 80. This can allow the propeller blades to move between a narrow closed position less than the diameter of the ice fishing hole 160 and situated along the axis of the elongated shaft, as shown in FIG. 1, and an extended open position greater than the diameter of the ice fishing hole and angled for chamfering the bottom of the ice fishing hole at a chamfering angle 128, as shown in FIG. 4. The narrow closed position can allow the chamferer 10 to have a narrow diameter that is less than the ice fishing hole diameter. This can allow the chamferer to be inserted into the ice fishing hole 160.

When the propeller blades 92 are in the narrow closed position, they can also be in a relaxed position when the propelling means is idle. The activation of the propelling means can cause the propeller blades to move to the extended open position.

as shown in FIGS. 2, 3, and 4, the ice fishing hole chamferer 10 can also have a foot stop 170 at the bottom of the submerged end 30 of the elongated shaft 20. This can allow the chamferer to be rested on a solid surface 164, such as the ground, floor, or ice, without the propeller 90 touching the ground, floor, or ice. This can help prevent damage to the propeller and blades 92 and provide stability when resting the chamferer on the ground or against a wall. The foot stop can be a rubber material attached to the end of the elongated shaft. The foot stop can be configured to prevent slippage and to absorb shock from setting it down.

The elongated shaft 20 can have a spacer (not shown) around the submerged end 30 of the elongated shaft between the thrust side 98 of the propeller blades 92 and the elongated shaft. This can space the propeller blades slightly away from the axis 50 for positioning the propeller blades in a better start position for thrusting water downward. Other means for positioning the propeller blades in a start position can be utilized, such as adding an additional propeller stop configured on the hub 80 towards the axis 50.

Figure 8:
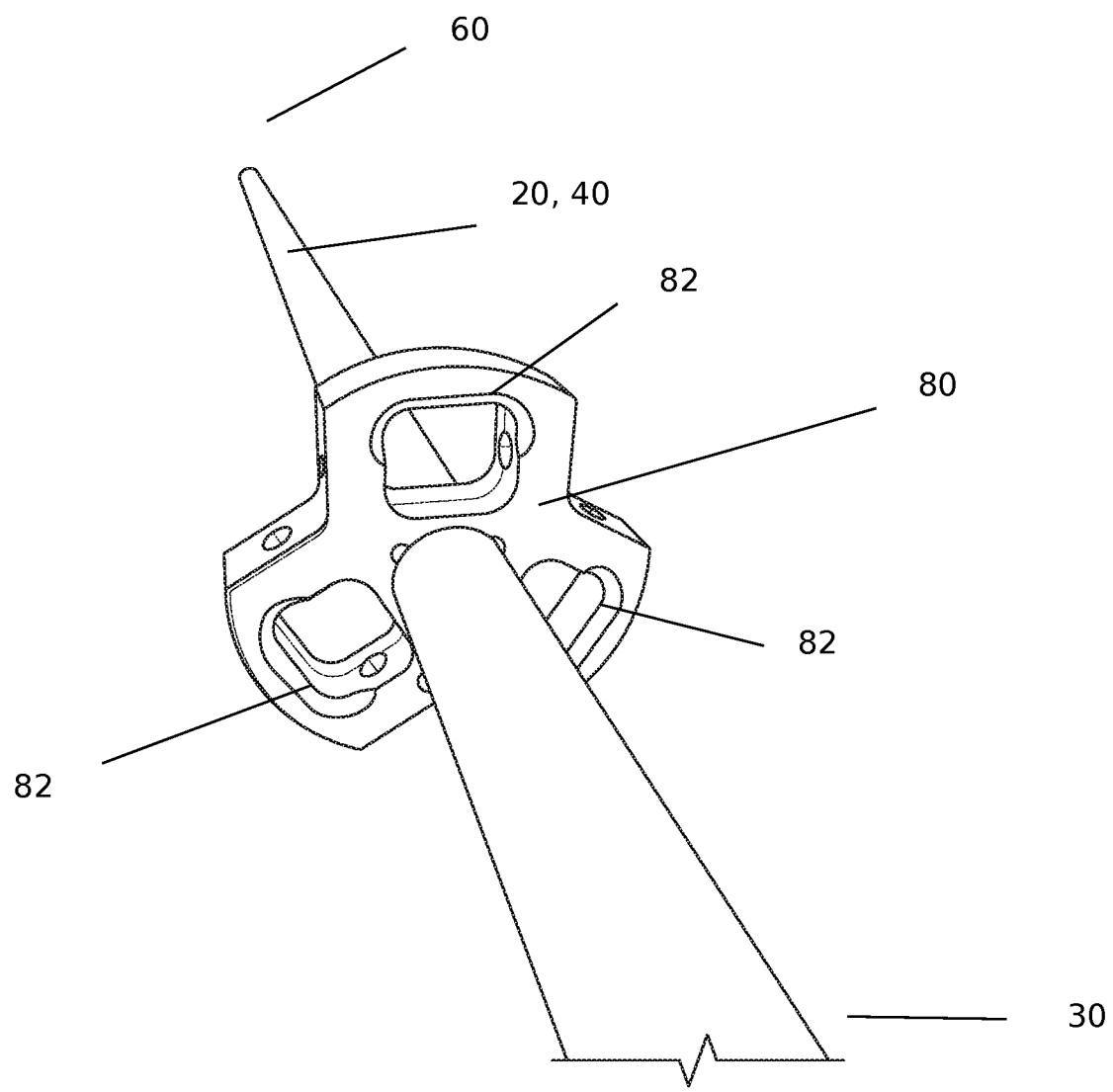
FIG. 8 shows a bottom front left perspective view of a hub on an elongated shaft of an ice fishing hole chamferer in accordance with an embodiment of the present invention with the propeller blades removed.

The invention 10 also provides for a means for rotating the elongated shaft 20 and engaging the rotation of the propeller 90, wherein the propeller blades 92 revolve and centrifugally extend to the extended position, as shown in FIG. 4, and thrust upwardly to engage the at least one cutter 94 against the bottom 162 of the ice fishing hole 160. By turning the elongated shaft 20, the propeller action of the propeller blades 92 can force the propeller blades to move to the extended position. As shown in FIG. 8, the hub 80 can have a propeller stop 82 for setting the fully extended position at the chamfering angle 128. The propeller stop can be an angled seat on the hub that stops the propeller blades from extending past the desired chamfering angle 128.

As shown in FIG. 1, the propeller blades 92 can be configured to be longer or larger for hand-operation and, as shown in FIG. 2, the propeller blades can be configured to be shorter or smaller for motor-operation of the ice fishing hole chamferer 10. The longer blades can generate more thrust power for use in hand operation. The shorter blades can reduce the thrust power for use with a motor, which can allow the angler to have better control of the chamferer when used at the high rotational speed of the motor. In one embodiment of a hand-operated chamferer, the propeller blades are approximately 17 inches long and extend approximately 14 inches from the axis 50 when the propeller blades are in the extended open position. In one embodiment of a motor-operated chamferer, the propeller blades are approximately 10¾ inches long and extend approximately 9¼ inches from the axis 50 when the propeller blades are in the extended open position.

In one embodiment of the invention, the ice fishing hole chamferer 10 has 1) an elongated shaft 20 for inserting into an ice fishing hole 160 with a top end 60 and a submerged end 30 and an axle 40 and an axis 50, 2) a propeller 90, and 3) a propelling means for rotating the propeller. The elongated shaft is the axle 40 and includes a foot stop 170 on the submerged end for resting the ice fishing hole chamferer on a solid surface 164. The foot stop extends beyond the propeller blades 92 when in the narrow closed position. The elongated shaft also has at least three adjustable lengths between approximately 50 inches and approximately 90 inches. The propeller has a cutter side 96 and a thrust side 98 configured for propelling water and a hub 80 for connecting to the axle three radiating propeller blades 92, each blade having a cutter removably and adjustably mounted on the cutting side of a trailing fin 130, an adjustable length between approximately 9 inches and approximately 17 inches, and a guide surface 120 on the cutting side of a leading guide plate 120 for aligning the cutter 94 at a cutting position against the bottom 162 of the ice fishing hole 160. The leading guide plate and the trailing fin form a blade angle 140 of approximately 121 degrees on the thrust side of the blade. The leading guide plate has at least one clearance opening 124 for allowing shaved ice to be washed away from the cutter 94. The propeller blades 92 are hinged to the hub to move between a narrow closed position less than the diameter of the ice fishing hole and situated along the axis of the elongated shaft and an extended open position greater than the diameter of the ice fishing hole and angled for chamfering the bottom of the ice fishing hole at a chamfering angle 128. When the propelling means is activated, the propeller 90 revolves about the axis and the propeller blades are configured to centrifugally extend to the extended open position and thrust upwardly to engage the cutters 94 against the bottom 162 of the ice fishing hole 160. The propelling means is removably connected to the top end 60 of the elongated shaft and turns the axle and the hub and the propeller around the axis. The hub 80 has a propeller stop 82 configured to set the extended open position at the chamfering angle 128 at approximately 45 degrees. The cutter has a cutting depth of approximately ⅛ inch.

The invention also provides for a method of using an ice fishing hole chamferer 10 by drilling an ice fishing hole 160, inserting an elongated shaft 20 with an axis 50 and having a collapsible propeller 90 configured to revolve around the elongated shaft 20, said propeller having a cutter side 96 with at least one cutter 94 for chamfering the bottom 162 of the ice fishing hole and a thrust side 98 for propelling water and thrusting the cutter side against the bottom 162 of the ice fishing hole 160, and rotating the elongated shaft to revolve the collapsible propeller around the axis 50 and to centrifugally extend from a narrow closed position less than the diameter of the ice fishing hole and situated along the axis of the elongated shaft, as shown in FIG. 1, to an extended open position greater than the diameter of the ice fishing hole 160 and angled for chamfering the bottom of the ice fishing hole, as shown in FIG. 4.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. An ice fishing hole chamferer for cutting a chamfer into a bottom of an ice fishing hole, comprising:
   an elongated shaft for inserting into the ice fishing hole having a top end and a bottom end with an axle and an axis;
   a propeller having a cutter side with at least one cutter and a thrust side facing towards the bottom end of the elongated shaft, configured for propelling water, said propeller having a hub for connecting to the axle and at least two radiating propeller blades, each blade having a leading guide plate and a trailing fin, said trailing fin angled towards the thrust side of the propeller, wherein the leading guide plate and the trailing fin form a blade angle therebetween along a length of each blade, and configured to generate sufficient upward thrust to engage the cutter side against the bottom of the ice fishing hole and cutting the chamfer into the bottom of the ice fishing hole, wherein the at least two propeller blades are hinged to the hub to move between a narrow closed position less than a diameter of the ice fishing hole and situated along the axis of the elongated shaft and an extended open position greater than the diameter of the ice fishing hole and angled for chamfering the bottom of the ice fishing hole at a chamfering angle; and
   a propelling means for rotating the propeller to generate sufficient upward thrust to engage the cutter side against the bottom of the ice fishing hole and cutting the chamfer into the bottom of the ice fishing hole,
   wherein the propeller revolves about the axis and the at least two propeller blades are configured to centrifugally extend to the extended open position and thrust upwardly to engage the at least one cutter against the bottom of the ice fishing hole when the propelling means is activated.

2. The ice fishing hole chamferer according to claim 1, wherein the at least two propeller blades are in a relaxed position and also in the narrow closed position when the propelling means is idle.

3. The ice fishing hole chamferer according to claim 1, wherein the at least one cutter is a cutting blade removably and adjustably mounted to the cutter side of the propeller.

4. The ice fishing hole chamferer according to claim 3, wherein the at least two propeller blades each have a guide surface for aligning the cutting blade at a cutting position against the bottom of the ice fishing hole.

5. The ice fishing hole chamferer according to claim 1, wherein the at least two propeller blades further comprise three radiating propeller blades; each blade having:
   a) the at least one cutter removably and adjustably mounted on the trailing fin on the cutter side of the propeller, and
   b) a guide surface on the leading guide plate on the cutter side of the propeller for aligning the cutter at a cutting position against the bottom of the ice fishing hole, and wherein the blade angle of the leading guide plate and the trailing fin is between 115 and 125 degrees, and wherein the leading guide plate has at least one clearance opening for allowing shaved ice to be washed away from the at least one cutter.

6. The ice fishing hole chamferer according to claim 1, wherein the elongated shaft is the axle, and wherein the propelling means is removably connected to the top end of the elongated shaft and turns the axle and the hub and the propeller around the axis, and wherein the propelling means is selected from a group consisting of a hand-powered mechanism, a motor, and an adapter configured to removably connect to an auger motor.

7. The ice fishing hole chamferer according to claim 6, wherein the propelling means is a hand brace and the at least two propeller blades are approximately 17 inches long and extend approximately 14 inches from the axis when the propeller is in the extended open position.

8. The ice fishing hole chamferer according to claim 6, wherein the propelling means is the adapter configured to removably connect to the auger motor and the at least two propeller blades are 11 inches long and extend 9 inches from the axis when the propeller is in the extended open position.

9. The ice fishing hole chamferer according to claim 1, wherein the hub has a propeller stop configured to set the extended open position at the chamfering angle, and wherein the chamfering angle is 45 degrees.

10. The ice fishing hole chamferer according to claim 1,
wherein the elongated shaft includes a foot stop on the bottom end for resting the ice fishing hole chamferer on a solid surface, and wherein the foot stop extends beyond the at least two propeller blades when in the narrow closed position;
wherein the elongated shaft has at least three adjustable lengths between 50 inches and 90 inches;
wherein the elongated shaft is the axle;
wherein the propelling means is removably connected to the top end of the elongated shaft and turns the axle and the hub and the propeller around the axis;
wherein the hub has a propeller stop configured to set the extended open position at the chamfering angle;
wherein the chamfering angle is between 30 and 60 degrees;
wherein the at least one cutter has a cutting depth of ⅛ inch; and
wherein the at least two propeller blades further comprise three radiating propeller blades; each blade having:
a) the at least one cutter removably and adjustably mounted on the trailing fin on a cutter side of the propeller,
b) an adjustable length between 9 inches and 17 inches,
c) a guide surface on the leading guide plate on the cutter side of the propeller for aligning the at least one cutter at a cutting position against the bottom of the ice fishing hole, and
wherein the blade angle of the leading guide plate and the trailing fin is between 115 and 125 degrees, and wherein the leading guide plate has at least one clearance opening for allowing shaved ice to be washed away from the at least one cutter.

11. A method of using an ice fishing hole chamferer for cutting a chamfer into a bottom of an ice fishing hole, the method comprising;
providing the ice fishing hole chamferer, said ice fishing hole chamferer comprising:
an elongated shaft for inserting into the ice fishing hole having a top end and a bottom end with an axle and an axis;
a propeller having a cutter side with at least one cutter and a thrust side facing towards the bottom end of the elongated shaft, configured for propelling water, said propeller having a hub for connecting to the axle and at least two radiating propeller blades, each blade having a leading guide plate and a trailing fin, said trailing fin angled towards the thrust side of the propeller, wherein the leading guide plate and the trailing fin form a blade angle therebetween along a length of each blade, and configured to generate sufficient upward thrust to engage the cutter side against the bottom of the ice fishing hole and cutting the chamfer into the bottom of the ice fishing hole, wherein the at least two propeller blades are hinged to the hub to move between a narrow closed position less than a diameter of the ice fishing hole and situated along the axis of the elongated shaft and an extended open position greater than the diameter of the ice fishing hole and angled for chamfering the bottom of the ice fishing hole at a chamfering angle; and
a propelling means for rotating the propeller to generate sufficient upward thrust to engage the cutter side against the bottom of the ice fishing hole and cutting the chamfer into the bottom of the ice fishing hole, wherein the propeller revolves about the axis and the at least two propeller blades are configured to centrifugally extend to the extended open position and thrust upwardly to engage the at least one cutter against the bottom of the ice fishing hole when the propelling means is activated;
inserting the ice fishing hole chamferer into the ice fishing hole; and
activating the propelling means.

* * * * *